United States Patent [19]

Okada

[11] Patent Number: 5,444,314
[45] Date of Patent: Aug. 22, 1995

[54] MINIATURE MOTOR

[75] Inventor: Kazuo Okada, Chiba, Japan

[73] Assignee: Mabuchi Motor Co., Ltd., Matsudo, Japan

[21] Appl. No.: 169,997

[22] Filed: Dec. 16, 1993

[30] Foreign Application Priority Data

Dec. 24, 1992 [JP] Japan .................. 4-088346 U

[51] Int. Cl.$^6$ ............................................. H02K 5/24
[52] U.S. Cl. .................................. 310/40 MM; 310/51
[58] Field of Search ............... 310/40 MM, 42, 51, 89

[56] References Cited

U.S. PATENT DOCUMENTS

| | | | |
|---|---|---|---|
| 1,688,891 | 10/1928 | Spreen | 310/51 |
| 2,301,425 | 11/1942 | List | 310/40 MM |
| 3,330,515 | 7/1967 | Janssen et al. | 310/51 |
| 3,459,977 | 8/1969 | Janssen | 310/51 |
| 3,527,969 | 9/1970 | Papst | 310/51 |

FOREIGN PATENT DOCUMENTS 59-50750  3/1984  Japan .................. 310/51

Primary Examiner—Clayton E. La Balle
Attorney, Agent, or Firm—McGlew and Tuttle

[57] ABSTRACT

A miniature motor comprising a case made of a metallic material, formed into a bottom hollow tubular shape and having a permanent magnet fixedly fitted to the inner circumferential surface thereof, a rotor consisting of an armature facing the permanent magnet and a commutator, and a case cover engaged with an open end of the case and comprising brushes making sliding contact with the commutator and input terminals electrically connected to the brushes; the rotor being rotatably supported by bearings provided on the bottom of the case and the case cover, and a printed circuit board having a control element and a soundproofing plate made of a soundproofing material being provided outside the case cover, in which the soundproofing plate is formed into a cross shape when projected on a plane orthogonally intersecting the axial line of the rotor.

3 Claims, 3 Drawing Sheets

MINIATURE MOTOR

BACKGROUND OF THE INVENTION AND RELATED ART STATEMENT

This invention relates generally to a miniature motor used for audio and video equipment, etc., and more particularly to a miniature motor having a soundproofing plate to reduce noise leaking to the outside and prevent vibration from being transmitted to a printed circuit board having a control element.

FIG. 1 is a longitudinal sectional view illustrating the essential part of an example of miniature motor to which this invention is applied. In FIG. 1, reference numeral 1 refers to a case made of a metallic material, such as mild steel, formed into a bottom hollow tubular shape and having an arc segment-shaped permanent magnet 2 fixedly fitted to the inner circumferential surface thereof. Numeral 3 refers to a case cover made of a thermoplastic resin material and formed so as to be engaged with an open end of the case 1. Numeral 4 refers to a rotor consisting of an armature 5 facing the permanent magnet 2 and a commutator 6, and rotatably supported by bearings 7 and 8 each provided on the case 1 and the case cover 3.

Numeral 9 refers to a brush arm made of an electrically conductive material, formed into a plate shape, having at the free end thereof a brush 10 making sliding contact with the commutator 6 and provided inside the case cover 3. Inside the case cover 3 also provided is an input terminal 11 electrically connected to the brush arm 9 so that power is fed from an external power source to the armature 5 via the brush arms 9, the brushes 10 and the commutator 6.

Numeral 12 refers to a printed circuit board having a control element 13, provided outside the case cover 3, and adapted so as to control current and/or voltage to be fed to the armature 5. Numeral 14 refers to a soundproofing plate made of a soundproofing material, such as an elastic material including rubber and synthetic resin, or a material having vibration-damping and soundproofing effects, such as cloth, paper, etc. and provided outside the printed circuit board 12. Numeral 15 refers to a shield plate.

With the aforementioned construction, when current is fed to the armature 5, rotating force is imparted to the armature 5 existing in a magnetic field produced by the permanent magnet 2 fixedly fitted to the inner circumferential surface of the case 1 to cause the rotor 4 to rotate, driving various types of equipment connected to the rotor 4. During motor rotation, the noise produced by the sliding contact between the brushes 10 and the commutator 6, for example, is absorbed by the soundproofing plate 14 to prevent noise from leaking to the outside.

In the miniature motor having the aforementioned construction, the soundproofing plate 14 is usually formed into a ring shape having an outside diameter corresponding to the inside diameter of the open end of the case 1, and an inside diameter corresponding to the outside diameter of a part at which the case cover 3 houses the bearing 8. Since the material comprising the soundproofing plate 14 is usually sold as a hoop material having a predetermined width or a cutlength sheet having predetermined length and width, the manufacture of ring-shaped soundproofing plates 14 by punching such commercially available materials having predetermined dimensions involves a low yield.

FIG. 2 is a diagram of assistance in explaining an example where conventional soundproofing plates 14 are formed by punching a commercially available cut-length sheet material. In FIG. 2, the commercially available cutlength sheet material, which has a predetermined width, tends to yield waste areas, as shown by shaded areas in the figure, even when punching a plurality of soundproofing plates 14 while bringing each soundproofing plate as near as possible to each other. In the example shown in FIG. 2, material yield for punching soundproofing plates 14 is less than 50%, leading to failure to accomplish the effective use of resources.

When providing the soundproofing plate 14 on the case cover 3 as shown in FIG. 1 in the prior art, on the other hand, there has been a misunderstanding that the soundproofing of a miniature motor would be impossible unless the entire end face of the case cover 3 is covered with the soundproofing plate 14. An experimental study by the present Inventor revealed, however, that the soundproofing of a miniature motor can be accomplished satisfactorily by covering a required minimum area, rather than covering the entire end face of the case cover 3. It has also been made clear that by selecting an appropriate shape of the soundproofing plate 14 covering the required minimum area, a predetermined soundproofing effect can be achieved and material yield can be substantially improved.

When a control element that has to be adjusted by using a tool, such as a variable resistor, is mounted on a printed circuit board 12, for example, in the conventional type of miniature motor, a tool inserting hole has to be provided on the soundproofing plate 14 at a location corresponding to the tool inserting hole on the print circuit board 12. To this end, positioning is needed to align the tool inserting holes. This makes the assembly work of the soundproofing plate 14 troublesome, leading to lowered productivity.

SUMMARY OF THE INVENTION

This invention is intended to overcome the problems inherent in the prior art. It is an object of this invention to provide a miniature motor having a soundproofing plate that can be manufactured at high yield and involves easy assembly work.

DETAILED DESCRIPTION OF THE EMBODIMENTS

Figure 1:
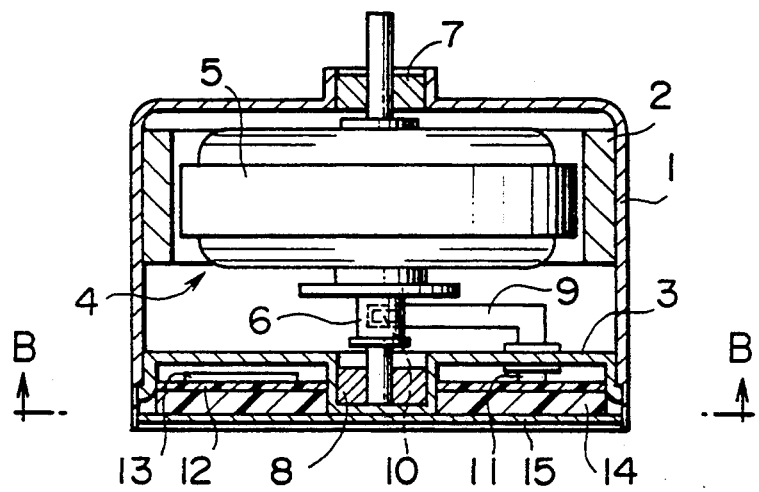
FIG. 1 is a longitudinal sectional view illustrating the essential part of an example of miniature motor to which this invention is applied.
Figure 3:
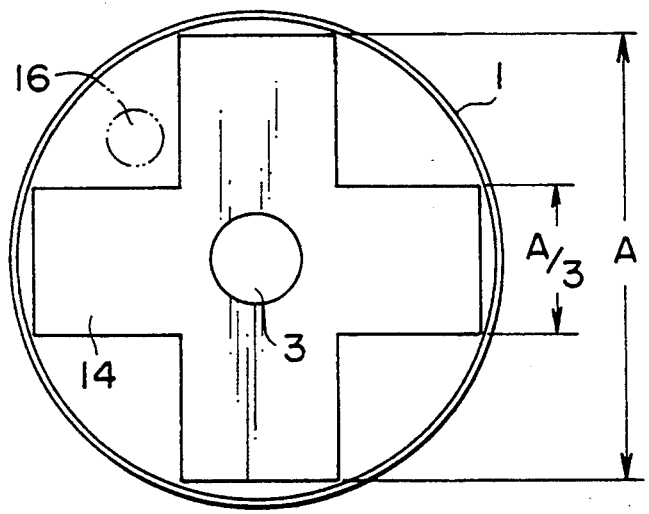
FIG. 3 is an end view illustrating an area in the vicinity of a soundproofing plate in an embodiment of this invention

FIG. 3 is an end view illustrating an area in the vicinity of a soundproofing plate in an embodiment of this invention, which is equivalent to a view taken along line B—B in FIG. 1. In FIG. 3, the soundproofing plate 14 is formed into a cross or X shape when projected on a plane orthogonally intersecting the axial line (the axial line of the rotor 4 in FIG. 1). When the outside dimensions of the soundproofing plate 14 is assumed to be a dimension A corresponding to the outside dimensions of the case cover 3 shown in FIG. 1 or the inside dimensions of the open end of the case 1, the width of the portion formed into a cross shape is formed into a size of substantially A/3.

Figure 2:
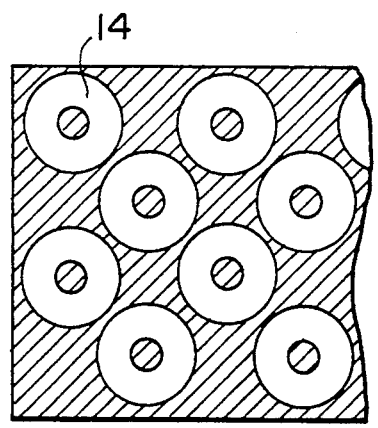
FIG. 2 is a diagram of assistance in explaining an example where conventional soundproofing plates are punched from a commercially available cutlength sheet material.
Figure 4:
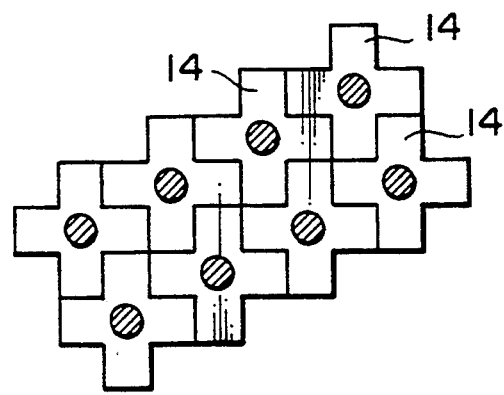
FIG. 4 is a diagram of assistance in explaining the state where soundproofing plates as shown in FIG. 3 are punched from a hoop material or a sheet material.
Figure 5:
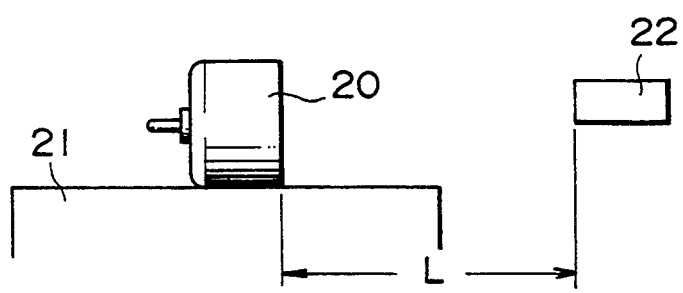
FIG. 5 is a diagram of assistance in explaining the state where noise in a miniature motor is measured.

FIG. 4 is a diagram of assistance in explaining the state where the soundproofing plates 14 in FIG. 3 are punched from a hoop material or sheet material (including a strip material). As shown in FIG. 4, the cross-shaped soundproofing plates 14 can be punched in a closely adjoining state like jig-saw puzzle pieces fitted together. Consequently, no waste material is produced between the adjoining soundproofing plates 14, and only the circular parts (as shown by shaded areas) left after the holes of the ring-shaped soundproofing plates have been punched are discarded as waste materials. As a result, it is obvious that punching yield can be substantially improved, compared with those in FIG. 2.

Even in a miniature motor of a specification having a screw-driver insertion hole 16 for adjusting a variable resistor at a location shown by a chain line in FIG. 3, the cross-shaped soundproofing plate 14 can be easily assembled without interfering with the screw-driver insertion hole 16. This makes assembly work extremely easy, leading to a substantial improvement in production efficiency.

Next, the measurement results of the noise leaking to the outside of miniature motors having soundproofing plates of various planar shapes mounted on the case cover are shown in the table below. In the measurement, the noise generated from a miniature motor 20 placed on a plate 21 made of a sponge material was measured by placing a directional microphone 22 at a location L=10 cm away from the miniature motor 20. The miniature motor 20 used in the measurement was a governor motor for audio equipment, which was rotated with no load at a revolution of 2,400 rpm.

| | |
|---|---|
| Soundproofing plate (1) Cross-shaped | Outside dimensions: 28.5 mm Width: 9.5 mm |
| Soundproofing plate (2) Circular-shaped | Outside diameter: 29 mm |
| Soundproofing plate (3) Rectangular-shaped | Width: 9.5 mm, length: 28.5 mm |
| Soundproofing plate (4) Circular-shaped | Outside diameter: 19.4 mm |

As is apparent from the table, noise could be abated by providing miniature motors with any types of soundproofing plates, but the soundproofing plates (3) and (4) reduced less noise due to small areas of the soundproofing plates covering the case cover. In miniature motors with the soundproofing plate (2), which was a circular disc of essentially the same outside diameter as that of the case cover, the average value was substantially reduced. In miniature motors having the soundproofing plate (1) of this invention, almost the same soundproofing performance was achieved, though the average value was slightly lower than that for the conventional soundproofing plate (2).

This invention having the aforementioned construction and operation can accomplish the following effects.

(1) The soundproofing plate of this invention has almost the same noise abating effect as the conventional soundproofing plate, despite the small area of the case cover covered by the plate.

(2) Material yield when punching the soundproofing plates from a hoop material or sheet material can be substantially improved.

(3) The soundproofing plate of this invention can be easily assembled into miniature motors, substantially improving production efficiency.

What is claimed is:

1. A miniature motor comprising a case made of a metallic material, formed into a bottomed hollow tubular shape and having a permanent magnet fixedly fitted to the inner circumferential surface thereof, a rotor consisting of an armature and a commutator, and a case cover engaged with an open end of said case and having brushes making sliding contact with said commutator

| Sample No. | Soundproofing plate (1) (Cross) | Soundproofing plate (2) (Circular) | Soundproofing plate (3) (Rectangular) | Soundproofing plate (4) (Circular) | (Unit: dB) Soundproofing plate (None) |
|---|---|---|---|---|---|
| 1 | 29 | 26 | 30 | 31 | 33 |
| 2 | 30 | 29 | 33 | 33 | 34 |
| 3 | 29 | 29 | 31 | 33 | 33 |
| 4 | 29 | 29 | 31 | 31 | 31 |
| 5 | 28 | 29 | 32 | 31 | 31 |
| 6 | 27 | 29 | 32 | 33 | 34 |
| 7 | 28 | 29 | 30 | 32 | 34 |
| 8 | 30 | 28 | 33 | 33 | 34 |
| 9 | 28 | 29 | 31 | 34 | 34 |
| 10 | 30 | 27 | 33 | 34 | 34 |
| Average | 28.8 | 28.4 | 31.6 | 32.5 | 33.2 |
| Standard deviation | 1.03 | 1.07 | 1.17 | 1.18 | 1.23 |
| Min. value | 27 | 26 | 30 | 31 | 31 |
| Max. value | 30 | 29 | 33 | 34 | 34 |

In the table above, soundproofing plates are made of a 3 mm-thick natural rubber plate and formed into the following outside dimensions, with the center hole diameter of 6.3 mm.

and input terminals electrically connected to said brushes; said rotor being rotatably supported by bearings provided on the bottom of said case and said case cover, and a printed circuit board having a control element and a soundproofing plate made of a soundproofing material being provided outside said case cover, characterized in that said soundproofing plate is formed into a cross shape when projected on a plane orthogonally intersecting the axial line of said rotor.

2. A miniature motor as set forth in claim (1) wherein the outside dimensions of said soundproofing plate is formed into substantially the same dimensions as the outside dimensions of said case cover or the inside diameter of said case open end, or into dimensions slightly smaller than them.

3. A miniature motor as set forth in claim (1) wherein if the outside dimensions of said soundproofing plate are represented by A, portions of said soundproofing plate constituting a cross shape is formed into a width substantially equal to A/3.

* * * * *